INVENTOR
CORMAC GARRETT O'NEILL
BY STEVENS, DAVIS, MILLER & MOSHER
ATTORNEYS

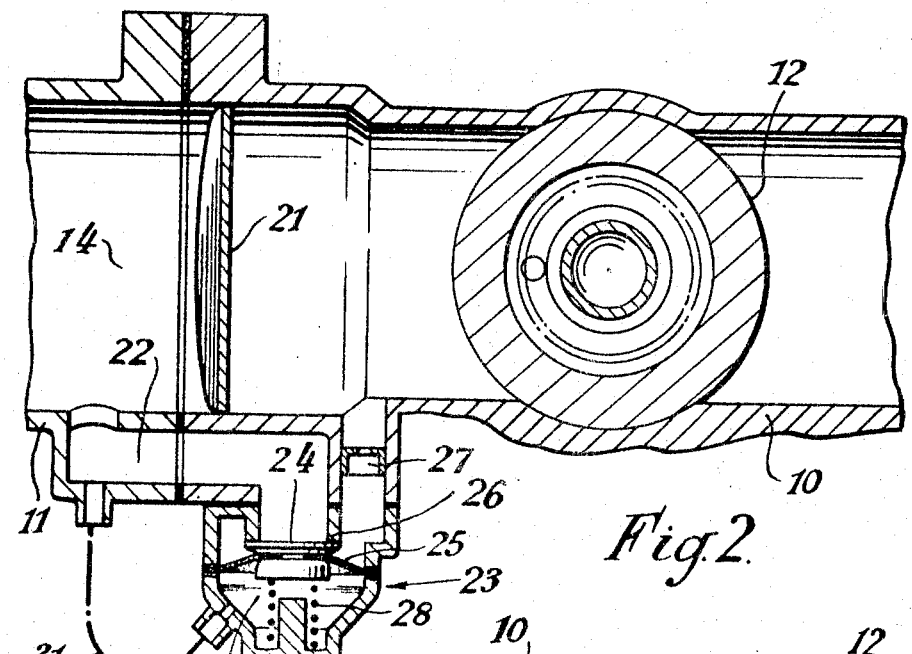
Fig.2.
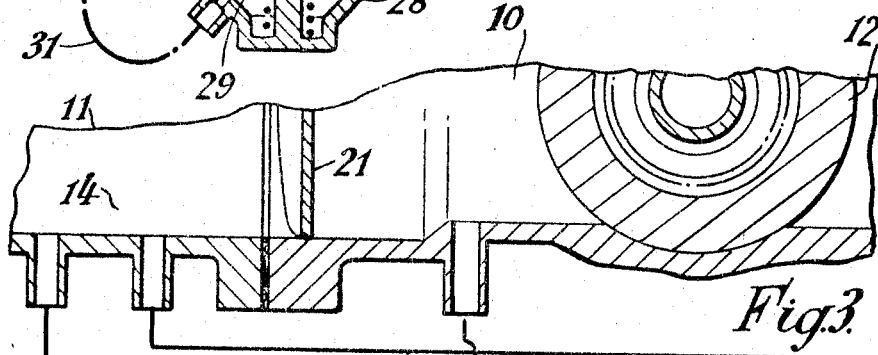
Fig.3.
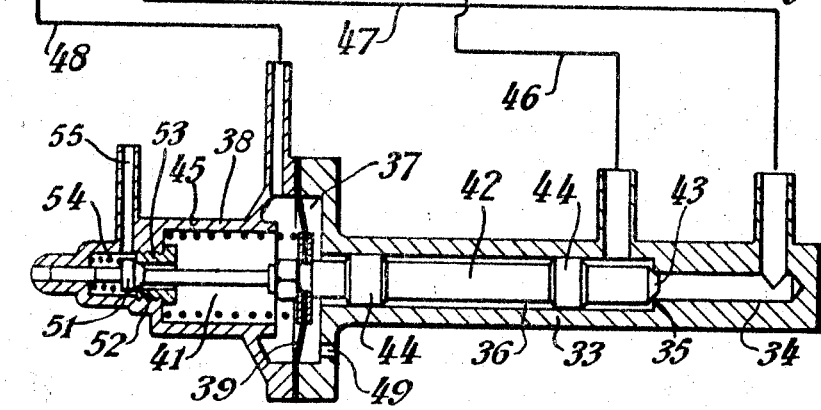

United States Patent Office 3,460,814
Patented Aug. 12, 1969

3,460,814
FUEL-AIR MIXTURE INTAKE SYSTEMS FOR
INTERNAL COMBUSTION ENGINES
Cormac Garrett O'Neill, Berkhamsted, England, assignor to The Zenith Carburetter Company Limited, Stanmore, Middlesex, England
Filed Aug. 9, 1967, Ser. No. 659,529
Claims priority, application Great Britain, Aug. 12, 1966, 36,239/66; Oct. 3, 1966, 44,083/66
Int. Cl. F02m 7/12
U.S. Cl. 261—44                                    8 Claims

ABSTRACT OF THE DISCLOSURE

A by-pass for the throttle valve of an internal combustion engine, closed by an obturator during most operating conditions, is opened when the throttle valve is closed and the depression downstream of the said throttle valve is above that which obtains during idling (i.e. during overrun conditions) to supply fuel/air mixture to the induction downstream of the throttle valve.

---

This invention relates to fuel/air mixture intake systems for internal combustion engines and has for its object to provide a system which provides better combustion of the mixture in the engine cylinders under certain conditions of engine operation.

During over-run conditions, that is to say when the engine throttle valve is closed and the engine is acting as a brake, the flow of fuel/air mixture past the throttle valve is maintained at a substantially constant value equivalent to the flow of mixture under idling conditions. The reason for this is that the manifold depression reaches a value of about 15 inches of mercury or above, which creates a 2:1 pressure drop across the throttle valve and produces critical flow conditions, no increase in flow being possible with further increase in manifold depression.

During over-run conditions, therefore, when the engine is turning at a relatively high speed, the reduced charge is shared between a greater number of induction strokes than during idling conditions, and the quantity of mixture entering each engine cylinder per stroke becomes less with increasing speed. In addition, the effect of high manifold depression during the "valve overlap" period when both the inlet and exhaust valves of an engine cylinder are open at the same time is to draw a considerable amount of exhaust gases back into the cylinder. Thus not only is the quantity of mixture fed into each cylinder reduced but, owing to the presence of a substantial quantity of exhaust gases, only some of the fuel is in contact with the air of the charge, and the effective fuel/air ratio is very lean. This leads to failure of the mixture to ignite and high emission of hydrocarbons in the engine exhaust.

It has already been proposed to arrange for additional air to be admitted to the inlet manifold under over-run conditions when the depression is very high, but this is only a partial solution of the problem since the fuel/air ratio remains lean and misfiring will still occur. It has also been proposed to provide means for moving the throttle valve to a position of greater opening when the manifold depression exceeds a predetermined value, such means including a diaphragm or piston subjected to a pressure differential depending on the depression, but the force necessary to move the throttle valve is such that a large diaphragm or piston is necessary, resulting in excessive bulk of the components required.

The provision of automatic opening means for the throttle valve has other disadvantages, one being that it adds to the complication of the throttle control linkage, another that means must be provided to prevent hunting of the throttle valve.

According to the present invention, in a fuel/air intake system for an internal combustion engine comprising an induction passage consisting of an upstream part and a downstream part and a throttle valve between said upstream and downstream parts, a by-pass connecting said upstream part and said downstream part of said induction passage is controlled by an obturator valve which normally closes said by-pass, the said by-pass supplying a fuel/air mixture to the downstream part of the induction passage when the obturator valve is open, the said obturator valve being adapted to open in response to the depression prevailing in said downstream part of the induction passage when said depression exceeds a predetermined value which is greater than the depression prevailing in said downstream part of the induction passage when the throttle valve is closed and the engine is running at its normal idling speed.

The invention is hereinafter described with reference to the accompanying drawings, in which:

FIGURE 2 is a sectional plan taken on the line 2—2 of FIGURE 1;

FIGURE 3 is a view similar to FIGURE 2 showing a modified obturator and control means therefor;

Figure 1:
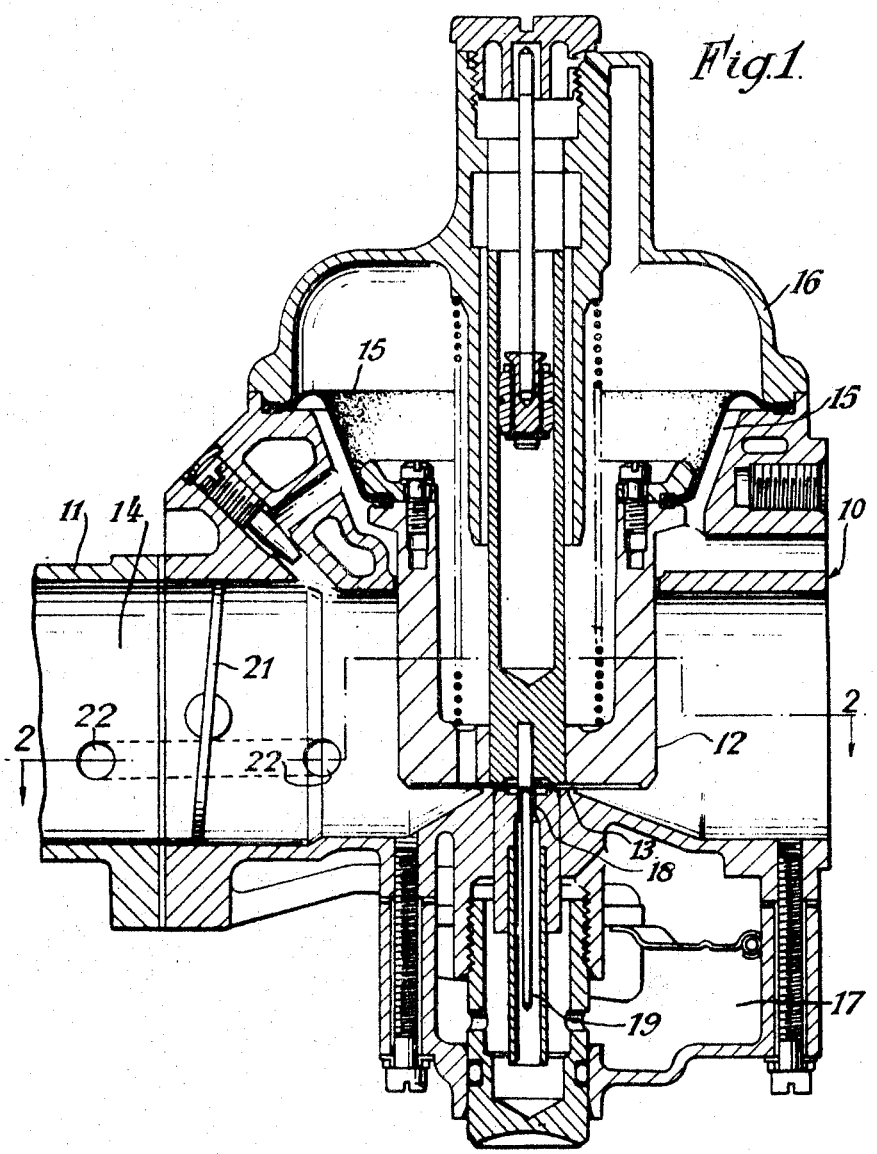
FIGURE 1 is a sectional elevation of a fuel/air intake system according to the invention in which a carburetter of the air valve type is employed.

Referring to FIGURES 1 and 2 of the drawings, the body of an air valve carburetter is shown at 10, and part of an inlet manifold of an internal combustion engine to which the carburetter is connected is shown at 11. A bore extending through the carburetter body, together with the bore of the inlet manifold constitutes an induction passage 14 and the air valve of the carburetter is a slide valve 12 co-operating with a bridge 13 in the said induction passage to form a throat. The air valve is controlled in the usual manner by differential air pressure acting on a diaphragm 15 dividing into two chambers a space enclosed in part by the carburetter body 10 and in part by a cap member 16 secured to the said body. A float chamber 17 connected to a jet 18 opening into the throat of the carburetter supplies fuel to the induction passage through the said jet, the effective area of the jet being varied, with the position of the air valve, by a profiled needle 19 attached to the latter. Fuel is drawn through the jet by air flow through the throat.

A butterfly throttle valve 21 is provided in the induction passage 14 downstream of the air valve 12, and a by-pass passage 22, only the ends of which are shown in FIGURE 1, extends from a position upstream of the throttle valve 21 to a position downstream thereof. As shown in FIGURE 2, the by-pass passage 22 is controlled by a valve 23 including a valve head 24 in the form of a disc mounted on a flexible diaphragm 25 and urged against a seating 26 to close the said passage. The maximum effective area of the by-pass passage 22, when the valve 23 is open, is governed by a restriction at 27.

As will be seen in FIGURE 2, air pressure in the part of the induction passage between the air valve and the throttle valve provides a reference pressure which acts on one side of the diaphragm 25 to urge the valve head off its seat, and a spring 28 acting on the other side of the diaphragm urges the said valve head on to its seat. The said other side of the diaphragm is exposed to air pressure in a chamber 29 connected by a conduit 31 to the part of the by-pass passage 22 downstream of the valve 23, and thus to the induction passage 14 downstream of the throttle valve 21.

Thus the opening force acting on the valve 23 and provided by the reference pressure is opposed by both the spring 28 and the pressure in the chamber 29, and the spring is arranged to provide a load such that, so long as the depression in the inlet manifold is less than a predetermined value, say 15″ Hg, the pressure differential across the diaphragm 25 is insufficient to move the valve head off its seat. Any higher depression, however, will produce a pressure differential which overcomes the spring load and unseats the valve head 24, thus opening the by-pass conduit.

The value of the depression in the inlet manifold at which the valve 23 is opened is selected so as to be somewhat greater than that which obtains during idling of the engine, so that, for idling, the mixture passes only through the induction passage itself and is governed by the throttle valve position. The greater depression during overrun conditions, however, by reducing the pressure in the chamber 29 in relation to the reference pressure, unseats the valve head 24 to open the by-pass passage and increase the air flow to the engine. Since the position of the air valve 12, and therefore the position of the needle 19, is related to the total air flow past the said air valve, the opening of the by-pass passage causes slight opening of the air valve and increased fuel flow, so that the fuel as well as the air is increased to provide a mixture giving satisfactory combustion.

Referring now to FIGURE 3 of the drawings, the carburetter body 10, inlet manifold 11; air valve 12, induction passage 14 and throttle valve 21 correspond to those shown in FIGURES 1 and 2. The obturator for the by-pass passage, and the control means therefor, are housed in a body 33 having a bore closed at one end. The said bore has a portion 34 of relatively small diameter adjacent its closed end and is stepped at 35 intermediate its ends to provide a portion of larger diameter 36 remote from said closed end. At its other end, the portion 36 of the bore opens into a cavity 37 of substantially greater diameter than the bore portion 36. A cap member 38 is secured to the rim of the said cavity, a flexible diaphragm 39 being provided which has its edge clamped between the rim of the cavity and the cap member 38, the diaphragm 39 closing said cavity and separating it from a further cavity 41 in the cap member 38.

The centre of the diaphragm 39 is clamped to a valve plunger 42 which extends into the valve bore, the valve plunger 42 having a diameter less than that of the larger portion 36 of the bore and greater than that of the smaller portion 34, and having a frusto-conical end portion 43 to engage the step 35 at the change of diameter of the bore. Two circumferential lands 44 on the valve plunger are a sliding fit in the larger portion 36 of the bore.

A spring 45, mounted in the cavity 41 acts on the valve plunger to urge the frusto-conical portion 43 thereof into engagement with the step 35.

The by-pass passage is constituted by two conduits, one of which, 46 connects the induction passage 14 upstream of the throttle valve 21 to the bore portion 36 between the step 35 and the adjacent plunger land 44, whilst the other 47, connects the induction passage 14 downstream of the throttle valve 21 to the smaller bore portion 34. The cavity 41 is also connected by a conduit 48 to the induction passage 14 downstream of the throttle valve, and the cavity 37 is connected at 49 to the atmosphere.

The diaphragm 39 is subjected to atmospheric pressure in the cavity 37 tending to unseat the valve plunger, the unseating thrust being opposed by the spring 45. The depression existing in the induction passage 14 downstream of the throttle valve 21 also acts in the cavity 41 to provide a differential pressure across the diaphragm 39, but, at the idling speed of the engine, this differential pressure is not sufficient to overcome the spring 45 and open the valve. When the by-pass is closed the said depression is also acting in the smaller diameter portion 34 of the valve bore and thus increases the resultant load tending to hold the valve plunger on its seat.

When the depression increases, during overrun conditions, to a value such that the atmospheric pressure acting on the diaphragm 39 is able to move it against the spring 45, the frusto-conical end 43 of the valve plunger moves away from the step 35 to open the by-pass and allow flow of air therethrough as previously described. The opening of the by-pass substantially eliminates the depression acting in the smaller bore portion 34, so that the resultant opening force on the by-pass valve for a given depression in the inlet manifold is increased, and the valve remains open even if the depression drops to a small extent. Similarly, when the depression falls sufficiently to allow the by-pass to re-close, it remains closed until a substantial increase in the depression again takes place.

The provision of means such as the by-pass passage herein described reduces the braking effect of the engine under over-run conditions, and it is therefore advantageous to provide means for restoring the braking effect, as, for example, by the use of an ignition retarder which is brought into action automatically when the by-pass is opened. When the arrangement described with reference to FIGURE 3 is used, a suction-operated ignition retarding device may be provided, which is not shown in the drawing, suction to operate the said device being derived from the cavity 41. A spring-closed poppet valve 51 normally engaging a seat 52 in a bush 53 mounted in a reduced portion 54 of the cap member 38 is moved off its seat by the valve plunger 42 when the latter is moved to open the by-pass, to connect to the said cavity 41 a passage 55 leading to the ignition retarder.

To ensure a rapid return to normal ignition timing when the by-pass valve closes, the suction-operated device which retards the ignition may be normally connected to the atmosphere through a calibrated bleed orifice which is small in relation to the passage area provided by the poppet valve 51 when it is unseated. Alternatively, the said poppet valve 51 may be replaced by a valve which normally engages a seat to isolate the said suction-operated device from the chamber 41 but is moved when the by-pass valve is opened on to another seat to close a vent connecting the said device to the atmosphere.

In the arrangement shown in FIGURE 2 of the drawings, the valve head 24 is urged against a seating 26 facing upstream of the by-pass passage, so that, when closed, its area within the seating is exposed to the depression in the induction passage 14 downstream of the throttle valve 21, and the diaphragm 25, on its side facing the by-pass passage, is exposed to the lesser depression in the mixing chamber 22.

Figure 4:
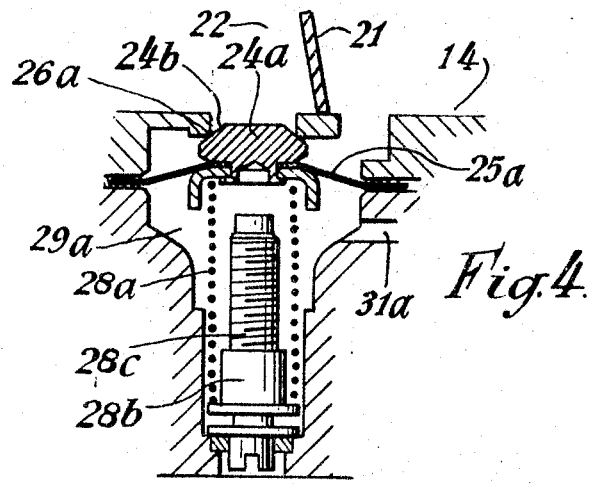
FIGURE 4 is a detail view showing a modified form of obturator.

In an alternative arrangement, shown in FIGURE 4, the seat 26a for the valve head 24a is formed around an opening leading into the mixing chamber 22 so that it is exposed to relatively lower depression in the mixing chamber 22, and the side of the diaphragm 25a facing the by-pass is exposed to the relatively higher depression in the induction passage 14 downstream of the throttle valve 21. The chamber 29a on the other side of the diaphragm is also subjected to the said relatively higher depression, being connected through the passage 31a to the induction passage downstream of the throttle valve. The opening force on the valve head is provided by the lower depression acting on the valve head 24a overcoming the resultant action of the higher depression on the diaphragm due to the different effective area of its two sides, and by the spring 28a.

In the arrangement shown in FIGURE 4 of the drawings, the valve head 24a constituting the obturator is formed with a tapered or frusto-conical surface 24b engaging the edge 26a of the opening leading into the mixing chamber, instead of being of flat disc shape and engaging a flat annular seating as shown in FIGURE 2. It will be understood that either form of valve head may be used in both the arrangements of FIGURES 2 and 4.

As also shown in FIGURE 4, the valve head 24a is urged on to its seat by a spring 28a the reaction of which is taken by a collar 28b, mounted on a screw 28c, so that the spring load acting on the valve head 24a can be adjusted, by rotating the said screw, to determine the value of the depression at which the said valve head leaves its seat. Corresponding means of adjustment may be provided for the spring 28 of FIGURE 2.

Figure 5:
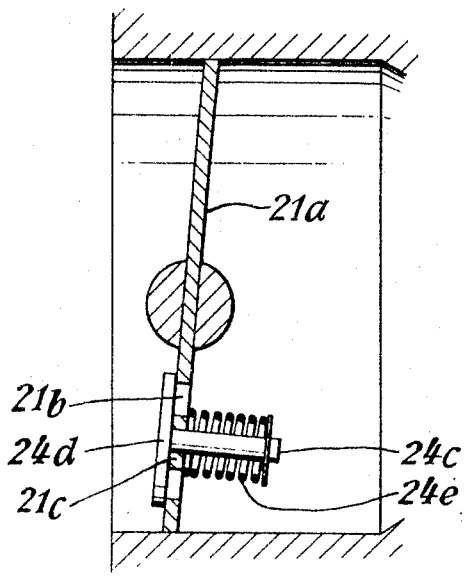
FIGURE 5 is a detail view showing the by-pass provided by an aperture in the throttle valve.

FIGURE 5 shows an arrangement according to the invention in which the by-pass, instead of being provided by a passage in the carburetter body, is provided by an aperture in the throttle valve itself. In FIGURE 5, which shows only a part of the induction passage of a carburetter and the throttle valve, the said throttle valve comprises a plate 21a formed with an aperture 21b in the centre of which is a guide 21c, supported by radial arms extending across the aperture, for a spindle 24c carrying an obturator valve head 24d on the downstream side of the throttle plate and urged against said throttle plate to close the aperture 21b by a spring 24e. Pressure in the upstream part of the induction passage, to the right of the throttle valve in FIGURE 5, tends to unseat the valve head 24d against the resistance of the spring 24e, but is able to do so only when the depression on the downstream side of the throttle valve rises above a predetermined value.

In the embodiments of the invention so far described the carburetting means has been of the air valve type. With such carburetting means, the opening of the by-pass passage, by increasing the total air flow through the throat of the carburetter, alters the position of the air valve to provide a corresponding change in the position of the fuel control needle relative to the fuel jet, so that additional fuel is supplied to the air passing through the by-pass passage.

In carburetting means of the fixed choke type, the main jet is substantially inoperative when the throttle valve is in the idling or slow running position, fuel being supplied through an idling orifice close to the edge of the throttle valve where it is subjected to suction due to the flow of air through the small gap between the throttle valve edge and the wall of the induction passage. Progression holes are also provided to supply additional fuel during the initial stages of throttle opening. In such a carburetter, the opening of a by-pass around the throttle valve may not increase the flow of fuel through any of the normal supply passages, and other means must be provided to supply additional fuel of the air passing through the by-pass passage to ensure a suitable mixture for good combustion.

Such means are shown in FIGURE 5 of the drawings which illustrates, in diagrammatic form, the main elements of a fixed choke carburetter. The normal fuel supply system is not shown, but it is to be assumed that there is a main jet delivering fuel into the venturi throat, an idling orifice adjacent the edge of the throttle valve, and progression holes arranged in the customary manner.

Figure 6:
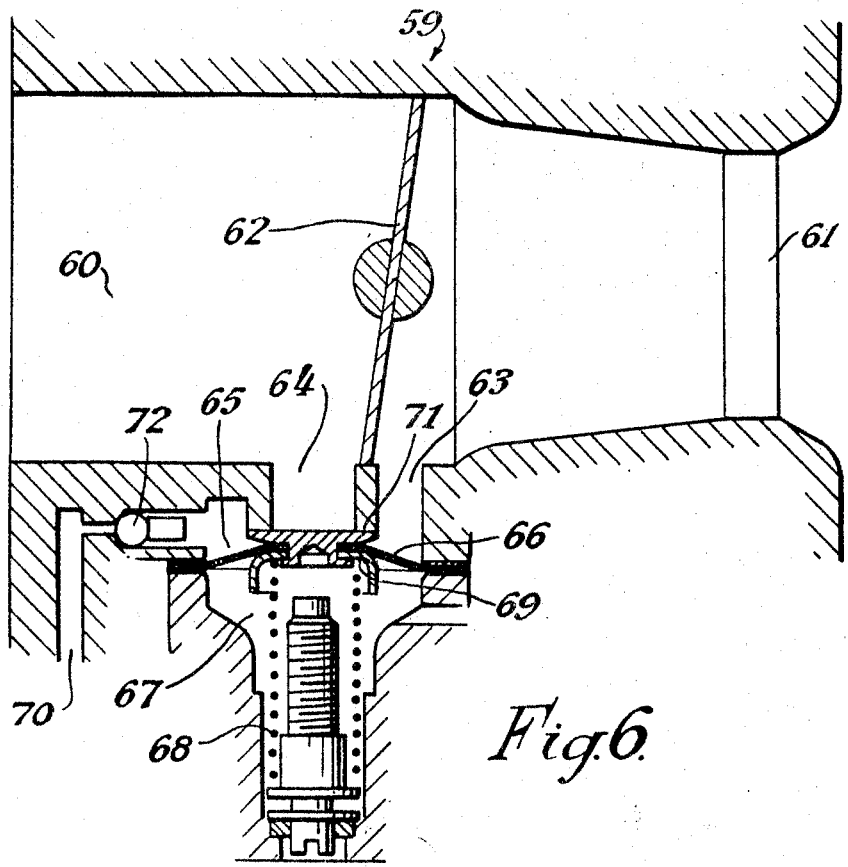
FIGURE 6 shows a fuel/air intake system according to the invention in which the carburetter is of the fixed choke type.

Referring to FIGURE 6 of the drawings, the body of the carburetter is shown at 59 and the induction passage in said body at 60, the venturi being indicated at 61. The throttle valve 62 is mounted in the induction passage 60, downstream of the throat.

A by-pass passage around the throttle valve 62 comprises an inlet portion 63 opening into the induction passage 60 upstream of the throttle valve, and a downstream portion 64 opening into the induction passage 60 downstream of the throttle valve, both portions leading into a chamber 65 closed by a movable wall in the form of a flexible diaphragm 66. A second chamber 67 on the other side of the diaphragm 66 houses a spring 68 acting to urge a disc-like valve closure member 69 mounted centrally on the diaphragm on to an annular seat 71 around the inner end of the passage portion 64. The chamber 67 is connected, as described with reference to FIGURE 2, to the induction passage 60 downstream of the throttle valve.

The valve closure member 69 thus acts as an obturator closing the by-pass passage 63, 64 so long as the depression downstream of the throttle valve does not exceed a predetermined value but when, due to overrun, the depression exceeds that value, the closure member 69 leaves its seat and additional air is supplied to the engine cylinders.

To enable additional fuel to be added to the air travelling through the by-pass passage a further passage, connected to a fuel supply, is connected into the by-pass passage in such a manner that air flowing in the said by-pass passage draws fuel from the further passage. For example, as shown in FIGURE 6, the further passage 70, connected through a calibrated jet (not shown) to a source of fuel supply and through another calibrated jet (not shown) to an air supply leads into the chamber 65, a non-return valve 72 being provided so that whilst, when the by-pass passage 63, 64 is open, a mixture of fuel and air can be drawn into the said by-pass passage through the non-return valve 72, pressure existing in the chamber 65 when the by-pass is closed will not pass into the passage 70.

To enable the value of depression in the induction passage at which the valve cloure member 69 leaves its seat to be adjusted, the spring 68 is provided with an adjustable abutment similar to that described with reference to FIGURE 4.

Air/fuel mixture intake systems are known in which a compound carburetter is used, such carburetters having two induction passages controlled by separate throttle valves which are opened in succession, that which is opened first controlling the supply of fuel/air mixture for idling and low power operation. Furthermore, it has been proposed to provide fuel/air mixture intake systems in which two conduit systems both connect the same carburetter or carburetters to the engine inlet ports, one system conveying the air/fuel mixture to the engine cylinders for idling and low power operation and the other being brought into use only when a high power output is required, separate throttle valves, openable in succession, being provided to control the two systems.

The present invention may be applied to either of the fuel/air intake systems referred to in the last preceding paragraph, the by-pass being associated with the throttle valve which controls the flow of air/fuel mixture for idling and low power operation.

I claim:
1. In an air valve carburetter comprising an induction passage consisting of an upstream part, a mixing chamber and a downstream part, a throttle valve between said mixing chamber and downstream part, an air valve between said upstream part and said mixing chamber, said air valve defining a throat of variable area in said induction passage, orifice means to supply fuel to said throat to mix with air passing therethrough and means controlled by the position of said air valve to increase the effective area of said orifice means as the throat area is increased, the improvement comprising passage means constituting a bypass between said mixing chamber and said downstream part, an obturator valve in said passage means which normally closes said bypass, and means responsive to the depression prevailing in the downstream part of the induction passage to open said obturator valve when said depression exceeds a predetermined value which is greater than the depression prevailing in said downstream part of the passage when the throttle valve is closed and the engine is running at its normal idling speed, whereby the opening of the passage means, by modifying the depression in the mixing chamber, moves the air valve to increase both the air flow and the fuel flow and admits an increased flow of fuel/air mixture to the downstream part of the induction passage.

2. The carburetter according to claim 1 wherein the obturator valve comprises a valve member and valve seat, spring means biasing said valve member onto said seat, a movable wall having said valve member attached thereto, said movable wall being subjected on one side to a reference pressure tending to unseat the valve member and on the other side to the depression in the downstream part of the induction passage, said depression also acting, when the valve member is seated, on a surface thereof to oppose unseating but ceasing to act on said surface when said valve member is unseated.

3. The carburetter according to claim 1 wherein said obturator valve is subjected, in the opening direction, to the differential between said depression and a reference pressure.

4. The carburetter according to claim 3 wherein said reference pressure is atmospheric pressure.

5. The carburetter according to claim 3 wherein said reference pressure is taken from the upstream part of the induction passage.

6. The carburetter according to claim 5, further comprising a housing, a movable wall having said obturator valve connected thereto and dividing said housing into a first chamber and a second chamber both connected to the downstream part of the induction passage and a conduit opening into the upstream part of the induction passage terminating at a seat for the obturator valve, a spring acting on said obturator valve in a direction to close it.

7. The carburetter according to claim 3 further comprising a movable wall subjected to said pressure differential, said obturator valve being connected to said wall and spring means acting on said wall in the direction to close the valve.

8. The carburetter according to claim 7 further comprising a housing divided by said movable wall into a first chamber and a second chamber respectively connected to the upstream part and the downstream part of said induction passage, and a conduit opening into said downstream part terminating at a seat for said obturator valve.

References Cited

UNITED STATES PATENTS

| | | | |
|---|---|---|---|
| 2,102,846 | 12/1937 | Hunt | 261—65 |
| 2,415,491 | 2/1947 | Hieger. | |
| 2,681,213 | 6/1954 | Gordon. | |
| 2,824,726 | 2/1958 | Dietrich et al. | |
| 3,210,055 | 10/1965 | Kingsley. | |
| 3,249,344 | 5/1966 | Smith. | |

FOREIGN PATENTS 360,263  6/1938  Italy.

TIM R. MILES, Primary Examiner

U.S. Cl. X.R.
261—50, 56; 123—97